May 12, 1959
J. G. JARVIS
2,885,853
FORAGE CROP HARVESTING CHOPPER
Filed Nov. 16, 1955
4 Sheets-Sheet 1
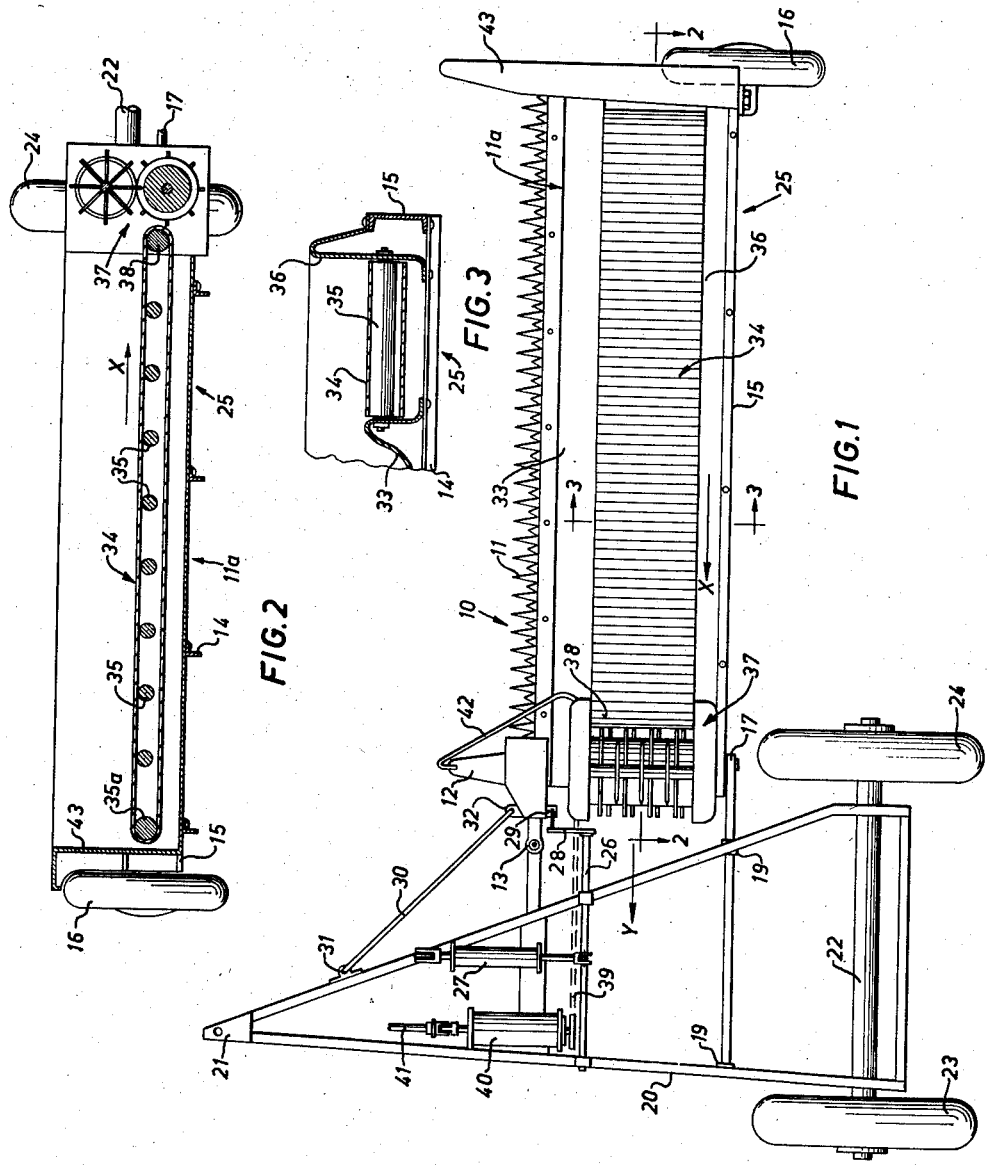
Inventor
JAMES G. JARVIS
by: J. Richard Cavanagh May 12, 1959 J. G. JARVIS 2,885,853
FORAGE CROP HARVESTING CHOPPER
Filed Nov. 16, 1955 4 Sheets-Sheet 3

Inventor
JAMES G. JARVIS
by: J. Richard Cavanagh

May 12, 1959  J. G. JARVIS  2,885,853
FORAGE CROP HARVESTING CHOPPER
Filed Nov. 16, 1955  4 Sheets-Sheet 4

Inventor
JAMES G. JARVIS
by: J. Richard Cavanagh

United States Patent Office 2,885,853
Patented May 12, 1959

2,885,853
FORAGE CROP HARVESTING CHOPPER

James Gordon Jarvis, Meadowvale, Ontario, Canada, assignor, by mesne assignments, to Grasslander (1957) Limited, Milverton, Ontario, Canada Application November 16, 1955, Serial No. 547,201

1 Claim. (Cl. 56—1)

This invention relates to harvester for hay, alfalfa and the like for use in the direct feeding of livestock.

Prior harvesting devices for foraging crops such as hay, cause the forage material to be crushed, broken and/or cut into very short irregular lengths. The resulting product, while accelerated in its drying characteristics, bleeds its natural nutrient juices to such an extent that it is not generally satisfactory for feed as compared with feed attained by pasture grazing of livestock.

It is the main object of the present invention to provide a forage harvester adapted to cut a forage crop into natural feed size without effecting bruising, crushing or powdering thereof, to obtain in one pass over a crop, a feed of natural characteristics which retains its nutritive juices for direct feed to livestock in enclosure.

It is another object of the invention to provide a harvester usable in a number of applications on the farms such as the direct feeding of livestock and the preparation of feed material for storage.

The term "natural feed" is intended to define a feed size corresponding to a natural bite size of a grazing animal which in the case of cattle may be of about hand size in length. For example, a relatively uniform straw feed of lengths between about two inches and about ten inches would be considered a natural feed according to this application whereas feeds comprised mainly of longer or shorter lengths of feed material would not. The average length of a "natural feed" suitable for sheep may be less than that suitable for cattle.

Other objects of the invention will be appreciated by a study of the following specification taken in conjunction with the accompanying drawings.

In the drawings:

Figure 1 is a plan view of a preferred form of the invention;

Figure 2 is a transverse section on the line 2—2 of Figure 1;

Figure 3 is an enlarged sectional view on the line 3—3 of Figure 1;

Figure 4:
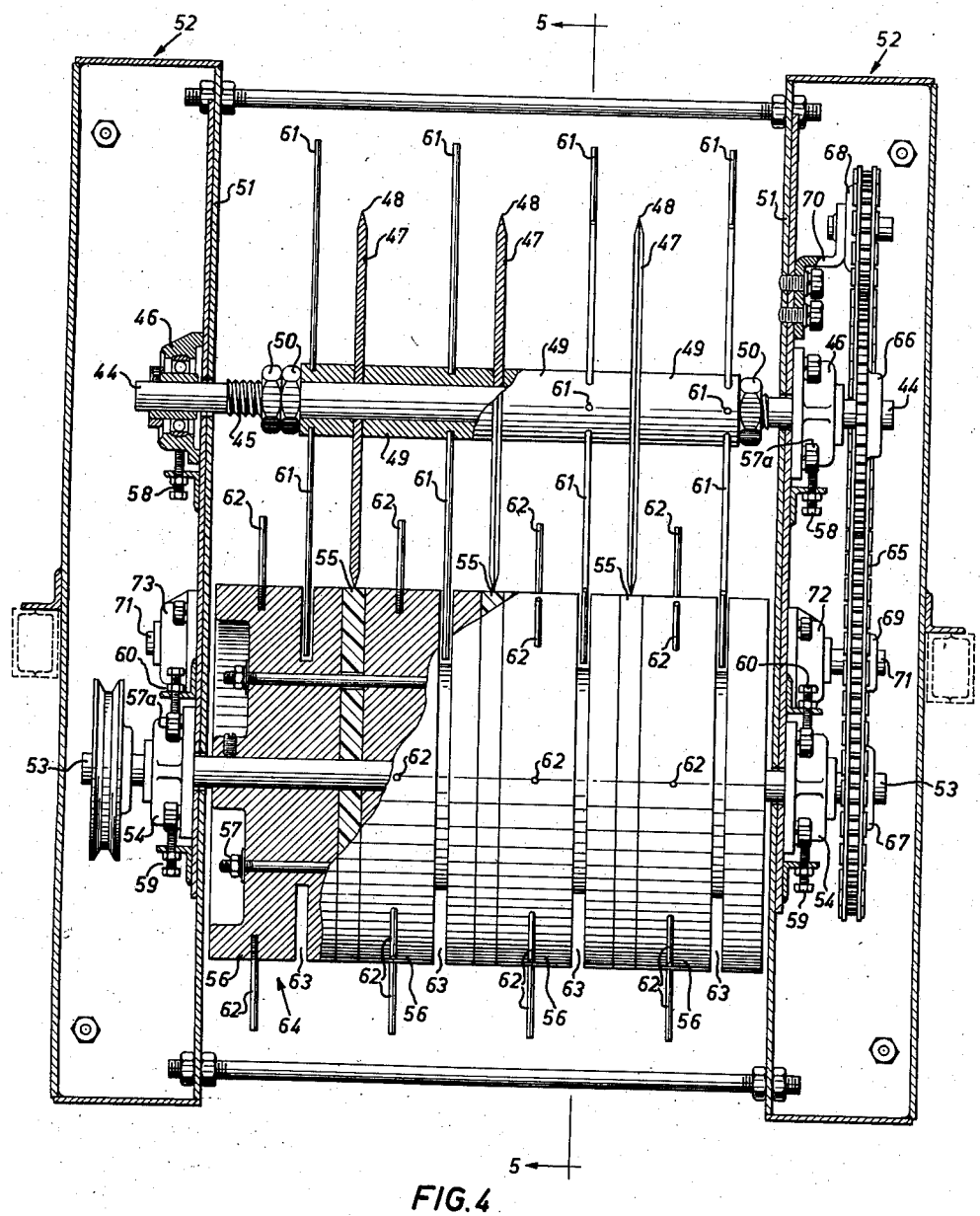
Figure 4 is an enlarged view, shown partly in section of feed chopping apparatus of a form preferably used in the harvester of Figure 1.

Referring to Figures 1 to 3, the harvesting unit 10 of the invention comprises the sickle cutter 11 driven by a conventional drive mechanism 12 operated by the pitman 13 connected from a power take-off device of a drawing vehicle (not shown). The sickle bar 11 is supported in a frame 11a which includes the spaced apart angle members 14 (Figures 2 and 3) extending rearwardly to a transverse upright channel member 15 pivoted on the outboard wheel 16 and the inboard shaft 17 supported by suitable hangers or bearings 19 in the A frame 20 which extends forwardly to the yoke piece 21 and rearwardly to an axle 22 carrying relatively large wheels 23 and 24. The sickle bar and frame, which latter is generally indicated by the numeral 25, being pivoted on the shaft 17 and axis of wheel 16, are adjustable for height of cut by means of the lever arm 26 mounted in the A frame 20 and actuated by a hydraulic cylinder 27. The lever arm 26 connects through the suitable linkage 28 to the inboard end of the cutter bar and fitting 29 thereof. A radius rod 30 connects from a fitting 31 on the A frame to an inboard fitting 32 of the cutter bar frame 25.

According to the invention, the ambulant structure comprising frames 11a and 20 having wheels 16, 23 and 24 is drawn forwardly while the cutter or sickle bar is actuated to sever a standing crop, which latter, when severed, falls rearwardly up the ramp strip 33 to a transverse belt 34 carried by a series of rollers 35 extending between the ramp strip 33 and the backing member 36. Belt 34 moves in the direction of arrow X and loosely conveys and feeds the cut crop to cutting mechanism 37 adapted to chop the material into approximately hand sized lengths and to discharge the cut material in the direction of arrow Y to the ground to form a windrow. The cutting mechanism 37 is of a rotatable form hereinafter disclosed in more detail and is operatively related in its rotation to a drive roller disposed at the head end 38 of belt 34, the cutter unit being driven by a chain or other drive connection 39 extending from drive mechanism 40 connected by shaft 41 to a power take-off device (not shown) of a driving vehicle.

As the harvester proceeds forwardly through a crop to be harvested, the deflecting rod 42 and the outboard divider 43, cause a standing crop to be drawn inwardly toward the sickle bar 11 and the material cut thereby be guided toward the belt 34 for transfer to the cutting apparatus 37.

The cutting apparatus may be of any well known form. While a shear type of cutting device has found wide acceptance in recent years, it is preferred herein to employ a cutting device which operates in accordance with a pressure cutting principle, in order to avoid rough handling of the material during cutting and to faciliate the severing of the material into regular lengths while requiring a minimum amount of power. In this connection, a pressure cutting principle is herein defined as that class of cutting effect accomplished by a sharpened edge moved toward a supporting surface through material impinged therebetween. While this principle may be accomplished by a series of transverse or longitudinally aligned rotating pressure cutting blades co-acting with a drum, it is preferred herein to employ a pressure cutting device devoid of vibration and in which a plurality of cutting discs disposed substantially in contact with a drum, are caused to cut material passed between the blades or discs and the drum.

Figure 5:
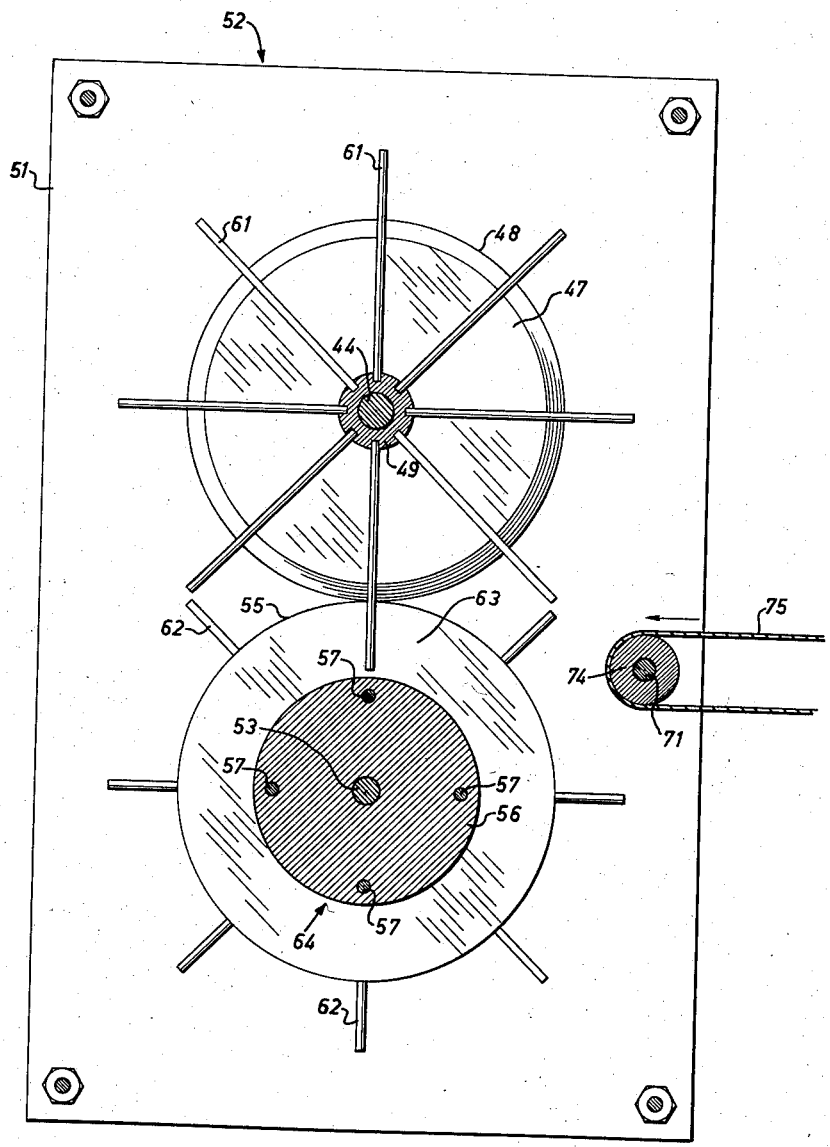
Figure 5 is a sectional view on the line 5—5 of Figure 4.

A preferred form of pressure cutting device is shown in Figures 4 and 5. A cutter shaft 44 threaded as at 45 toward the outward ends and supported in bearings 46, carries pressure cutting discs 47 thereon having cutting edges 48. The cutting discs are maintained in predetermined spaced relationship by a series of spacers 49 held in assembly therewith by means of the nuts 50. Bearings 46 are preferably supported by side walls 51 of outwardly directed side housings 52, which side walls also support a roller shaft 53 in bearings 54. The pressure discs 55 may be formed of hard fibre, rubber or other suitable cutting strip material and are held in spaced apart cutting disc engaging relation by spacer discs 56 of the same diameter, the pressure discs and spacer discs being held in assembly by bolts 57. The bearings 46 and 54 may be adjusted for parallelism of the shafts 44 and 53 and desired spacing of the latter by reason of slots in the bearing housings which serve to accommodate the fastening bolts 57a thereof, the adjustment being controlled by adjusting means 58, 59 and 60.

Figure 6:
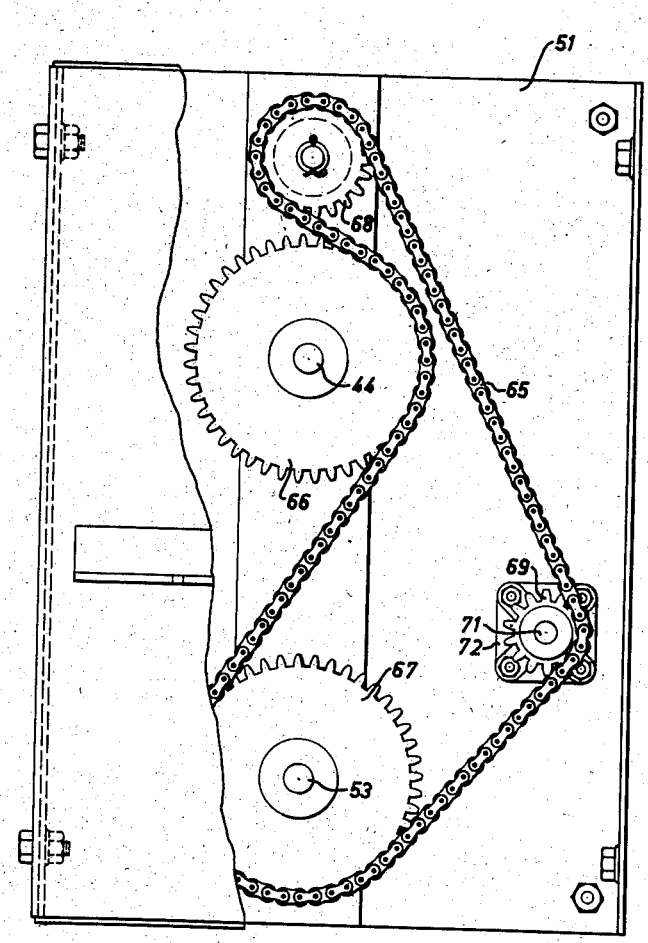
Figure 6 is a view of one side of the feed chopping apparatus of Figure 4, to a slightly different scale therefrom with a portion of the cover removed to reveal drive connections therein.

As shown in Figure 5, the pressure cutting device of the preferred form shown, embodies means for carrying material being cut therethrough in the form of the radial feeding fingers 61 extending from the spacers 49 of the cutting disc shaft 44 and the co-operating radial fingers 62 spaced therebetween and extending from the spacing discs 56 on the roller shaft 53. The feeding fingers 61 swing in an arc of greater radius than the radius of the cutting discs 47 and pass through the co-operating annular recess 63 of the co-operating roller structure 64, the recess being formed in the spacing discs 56 thereof. The shafts 44 and 53 are driven in opposite directions of rotation preferably by means of a chain 65 (Figure 6) extending about drive sprockets 66 and 67 respectively and mounted in one of the side housings 52 as shown. Suitable idler sprockets 68 and 69 support the chain for the driving effect required while the idler sprocket 68 is adjustable on its supporting bracket 70 for adjusting the tensioning of the chain 65. Sprocket 69 preferably is carried by shaft 71 mounted in bearing 72 and extending across the unit for support in a corresponding bearing 73 in the other side housing whereby the shaft 71 may support a drive roller 74 as shown in Figure 5 for a discharge belt 75.

In the alternative and especially in the application of the cutting unit to the harvester of Figure 1, the cutting discs are driven in a direction in conjunction with the drive of the roller 74 whereby the latter serves to drive the conveying belt 34 in a direction toward the cutting unit.

It will be appreciated that forage material cut by the harvester of the invention may be deposited in a windrow in regularly cleanly cut and uncrushed form for curing purposes. After curing in the open air, the windrow cured material may be picked up by a conventional pick-up mechanism and conveyed preferably by a belt to a portable bin from which it is again conveyed to storage or to direct feed of livestock. In this respect, it is contemplated that the windrow material may be picked up and passed through artificial drying apparatus if desired or other curing means, it being intended, however, that the material however handled, be conveyed and treated in such manner that crushing, bruising and powdering thereof is minimized.

What I claim as my invention is:

In a harvesting chopper for forage crops having an ambulant structure and crop retrieving mechanism on said structure the combination therewith of a chopper unit on said structure including rotatable pressure cutters of the disc type and a cooperating rotatable pressure cutting supporting drum; feeding fingers between said disc type cutters and movable therewith; and a loose forage type belt conveying means between said crop retrieving mechanism and said chopper unit whereby forage is harvested and delivered in a loose condition to said chopper to produce a fodder which is of a desired length and which will retain a large percentage of its natural food values.

References Cited in the file of this patent

UNITED STATES PATENTS

| | | |
|---|---|---|
| 500,181 | Atkinson | June 27, 1893 |
| 739,817 | Berchtold | Sept. 29, 1903 |
| 1,960,596 | Rimple | May 29, 1934 |
| 2,494,388 | Heth | Jan. 10, 1950 |
| 2,664,684 | Russell | Jan. 5, 1954 |
| 2,704,429 | Scarlett et al. | Mar. 22, 1955 |
| 2,716,318 | Skromme | Aug. 30, 1955 |

FOREIGN PATENTS

| | | |
|---|---|---|
| 260,241 | Switzerland | July 15, 1949 |